Jan. 9, 1940.  H. J. L. FRANK ET AL  2,186,376
TROLLEY AND CURRENT COLLECTOR MEANS
Original Filed May 25, 1934
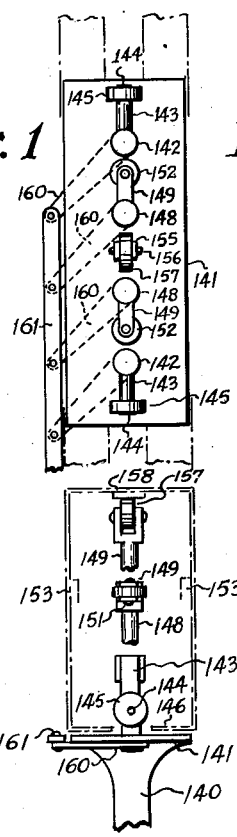
Fig. 1
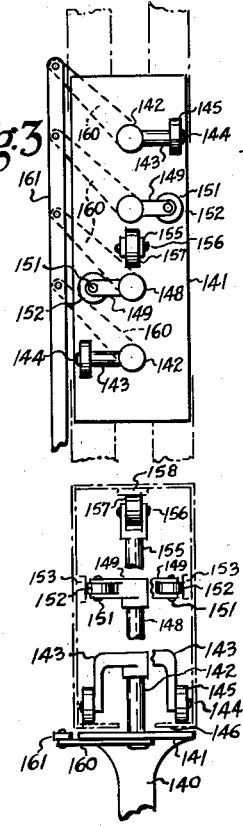
Fig. 3
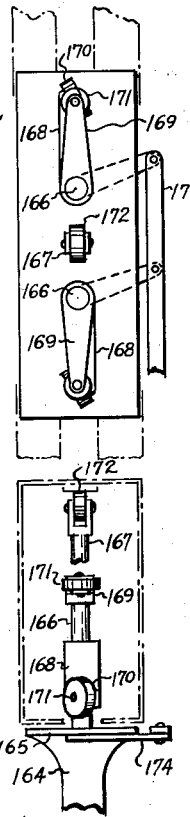
Fig. 5
Fig. 2   Fig. 4   Fig. 6
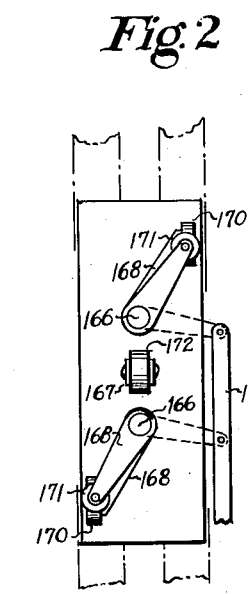
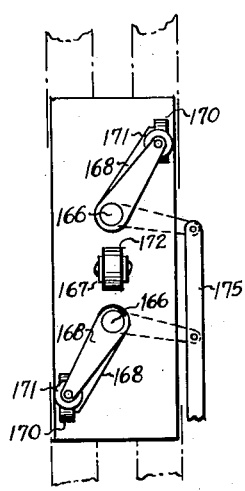
Fig. 7
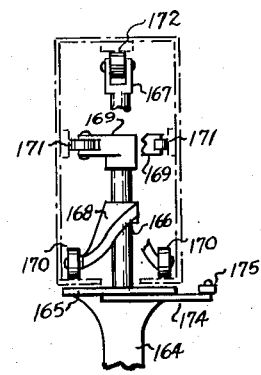
Fig. 8
INVENTOR.
Harrison J. L. Frank
Joseph A. Messing
BY Daniel G. Cullen ATTORNEY.

Patented Jan. 9, 1940

2,186,376

UNITED STATES PATENT OFFICE 2,186,376

TROLLEY AND CURRENT COLLECTOR MEANS

Harrison J. L. Frank and Joseph A. Messing, Detroit, Mich.

Application April 16, 1938, Serial No. 202,402, which is a division of application August 26, 1935, Serial No. 37,953, which is a division of applications May 25, 1934, Serial No. 727,516 and May 6, 1935, Serial No. 20,113. Divided and this application October 17, 1938, Serial No. 235,398

1 Claim. (Cl. 191—45)

This invention relates to trolley and current collector means particularly adapted for use in connection with the stationary bus duct of a current distributing system such as the one previously disclosed in Patent No. 2,018,846 of October 29, 1935. The instant application is a division of our prior application Serial No. 202,402 filed April 16, 1938, which in turn is a division of application Serial No. 37,953 filed August 26, 1935, which in turn is a division of applications Serial No. 727,516 filed May 25, 1934, now Patent No. 2,018,016 of October 22, 1935, and Serial No. 20,113 filed May 6, 1935, now Patent No. 2,052,972 of September 1, 1936.

The instant application relates specifically to trolley and collector means for withdrawing current from slotted tube bus duct.

The principal objects of the present invention are to provide trolley and collector means which shall be of light weight and small size and which have a high degree of economy of manufacture and efficiency of operation.

Objects of the invention, which relate more distinctly to novel and important details of manufacture of the collector means shown and described herein, will be readily apparent upon reference to the following detailed descriptive matter relating to the appended drawing.

Referring to the drawing, it will be seen that—

Figs. 1 to 2 show in top plan and in cutaway elevation and with the parts in insertion and withdrawal position a trolley arrangement representing one embodiment;

Figs. 3 and 4 are similar views but with the parts shown in trolley inserted position;

Figs. 5 to 8 are similar views of another embodiment.

For use with the bus duct heretofore mentioned as being shown in Patent No. 2,018,846, there have been designed trolleys and plug collectors of various forms, and these will now be described in detail.

The collector of Figs. 1-4

In these figures there is shown a collector of the trolley type which can be inserted into or withdrawn from a duct at any point of the latter. The collector includes a handle or post 140 to whose upper end is rigidly connected a base plate 141. Projecting upwardly from this plate, in alignment, and swivelly secured thereto are a plurality of posts, five being shown. The outer pair of posts, referenced 142, at their upper ends are equipped with transversely projecting members 143. These are bent downwardly and at their ends are trunnioned, on axles 144, riding wheels 145 adapted to ride on the rails 146 of the duct. The next adjacent pair of posts, referenced 148, at their upper ends are provided with transversely projecting members 149 to whose ends are trunnioned, on axles 151, collector wheels 152 adapted to ride along the bus bars 153 of the duct. The central post 155, at its upper end is forked, and is provided with an axle 156 which trunnions a collector wheel 157 adapted to engage the bus bar 158 in the top of the duct. As indicated, the posts 142, 148, and 155 are of different vertical lengths, and the parts thereof are in different horizontal planes, so that they will cooperate with the parts of the duct which are on different planes.

Certain electrical details have been omitted from this disclosure, it being the intention of these figures to disclose only those parts which provide a novel operation to the device, which operation will now be described specifically.

When the trolley is to be inserted into or withdrawn from a duct, the posts are first rotated by the cranks 160, connected thereto, and disposed under the base plate 141, to the position of Figs. 1-2, so that all of the posts have their transversely projecting parts in alignment with one another. Simultaneous rotation of the cranks 160 may be effected by means of the shifter rod 161 connected to the cranks at their ends.

With the parts in this position, the trolley can be inserted or removed from a duct, as can readily be seen. After insertion is effected, the shifter rod 161 is moved from the position of Fig. 1 to the position of Fig. 3, to rotate the cranks as indicated. This rotates the posts and the transversely projecting parts, so that these parts move towards the side wall of the duct and engage those parts of the duct with which they are intended to cooperate. This also interlocks the trolley to the duct, as can readily be seen.

The trolley of Figs. 5-8

In these figures there is shown a trolley which is more or less similar to that of Figs. 1-4, differing therefrom specifically in that there are only three posts, rather than the five of Figs. 1-4. Each of the posts of the instant species bears two transversely projecting parts, one of which is adapted to support a riding wheel and the other is adapted to support a collector wheel. As shown, there is provided a handle or post 164 on whose upper end is a base plate 165. Swivelled to the latter are the rotary posts 166 of which two are shown, and between these posts is a central fixed post 167. The posts 166, in different horizontal planes, support transversely projecting arms 168 and 169. The arms 168 at their ends trunnion vertical riding wheels 170 and the arms 169 at their ends trunnion horizontal collector wheels 171. The post 167, at its upper end, supports a vertical collector wheel 172.

The operation of the device will be readily apparent. When the parts are in the position of Figs. 5–6, the device may be inserted into a trolley, due to the fact that the posts 166 are so rotated that their arms 168—169 are in alignment with one another and with the opening in the bottom wall of the duct. After insertion has been effected, the posts 166 may be rotated by the cranks 174 connected thereto, which cranks are provided with a common shifter rod 175. Movement of the shifter rod 175 to the position shown in Fig. 5 causes rotation of the parts to the position of Figs. 7–9, whereupon riding wheels 170 will engage the bus bars on the sides of the duct. The trolley will thus be interlocked to the duct.

We claim:

A detachable trolley for use with duct having rails on the slotted bottom, and on the sides, comprising a base having aligned upwardly projecting posts, certain of the posts having transversely projecting arms having on their ends rollers arranged to roll along the rails on the duct bottom and sides, the posts all being in line so as to be insertable into the duct through the slot, means for simultaneously rotating the arms around the axes of their posts so that all of the arms and rollers thereon may be aligned, with the posts, to permit the posts, arms, and rollers to be inserted into the duct through the slot, or so that the arms may be rotated out of line to present their rollers to their rails.

HARRISON J. L. FRANK.
JOSEPH A. MESSING.